United States Patent [19]

Hara et al.

[11] Patent Number: 4,895,127
[45] Date of Patent: Jan. 23, 1990

[54] IGNITION TIMING CONTROL SYSTEM

[75] Inventors: Toshiro Hara; Takanori Fujimoto; Masahira Akasu, all of Himeji, Japan

[73] Assignee: Mitsubishi Denki Kabushiki Kaisha, Tokyo, Japan

[21] Appl. No.: 192,529

[22] Filed: May 11, 1988

[30] Foreign Application Priority Data

May 14, 1987 [JP] Japan .................. 62-119778
May 15, 1987 [JP] Japan .................. 62-119229
May 15, 1987 [JP] Japan .................. 62-119230

[51] Int. Cl.$^4$ ................. F02P 7/077; F02P 11/00
[52] U.S. Cl. ............................ 123/643; 123/630
[58] Field of Search ............ 123/414, 416, 417, 643, 123/630

[56] References Cited

U.S. PATENT DOCUMENTS

| | | | |
|---|---|---|---|
| 4,596,227 | 6/1986 | Hashizume | 123/643 |
| 4,658,786 | 4/1987 | Foss et al. | 123/643 X |
| 4,726,347 | 2/1988 | Sasaki et al. | 123/643 |
| 4,757,798 | 7/1988 | Sasaki | 123/643 |

FOREIGN PATENT DOCUMENTS

| | | |
|---|---|---|
| 71910 | 2/1983 | European Pat. Off. |
| 95708 | 12/1983 | European Pat. Off. |
| 2645350 | 4/1977 | Fed. Rep. of Germany |

Primary Examiner—Tony M. Argenbright
Attorney, Agent, or Firm—Oblon, Spivak, McClelland, Maier & Neustadt

[57] ABSTRACT

An ignition timing control device for an internal combustion engine includes a load detector for detecting a load on the engine, an engine-revolution detector for detecting a number of revolution of the engine, a cylinder discrimination signal generator for generating cylinder discrimination signals, an operating device for operating the optimum ignition timing for the engine based on the outputs from the load detector and the engine-revolution detector, a drive signal generator for generating drive signals corresponding to the ignition timing for each of the ignition coils provided in each cylinder, and a distributor for distributing the drive signal to each of the ignition coils in an appropriate sequence on the basis of the cylinder discrimination signal. The distributor is provided with a distribution sequence maintaining device for maintaining the distribution sequence of the drive signal, even when the cylinder discrimination signal is stopped. The distributor also predicts an ignition coil to which the drive signal is to be distributed from an ignition coil, and that to which the drive signal has been distributed previously, and distributes the drive signal to the predicted ignition coil in case an ignition coil designated by the cylinder discrimination signal is different from the predicted ignition coil.

4 Claims, 13 Drawing Sheets

NORMAL SGC

ABNORMAL SGC

IGNITION TIMING CONTROL SYSTEM

BACKGROUND OF THE INVENTION

1. Field of the Invention

This invention relates to an ignition control device for a low tension distribution system in an internal combustion engine.

2. Discussion of Background

Conventional ignition timing control devices are of two types: one is a high tension distribution system, in which a high tension voltage is applied to the ingnition plug for each engine cylinder through a single rotor; and the other is a low tension distribution system, in which a drive signal is distributed to each ignition plug provided in each engine cylinder. This low tension distribution system is used for the purpose of improving the engine performance by increasing the ignition energy, reducing the sources of noise by elimination of high tension power distribution, improving quality of the device as the commercial product to be circulated in the market, and so on.

Figure 1:
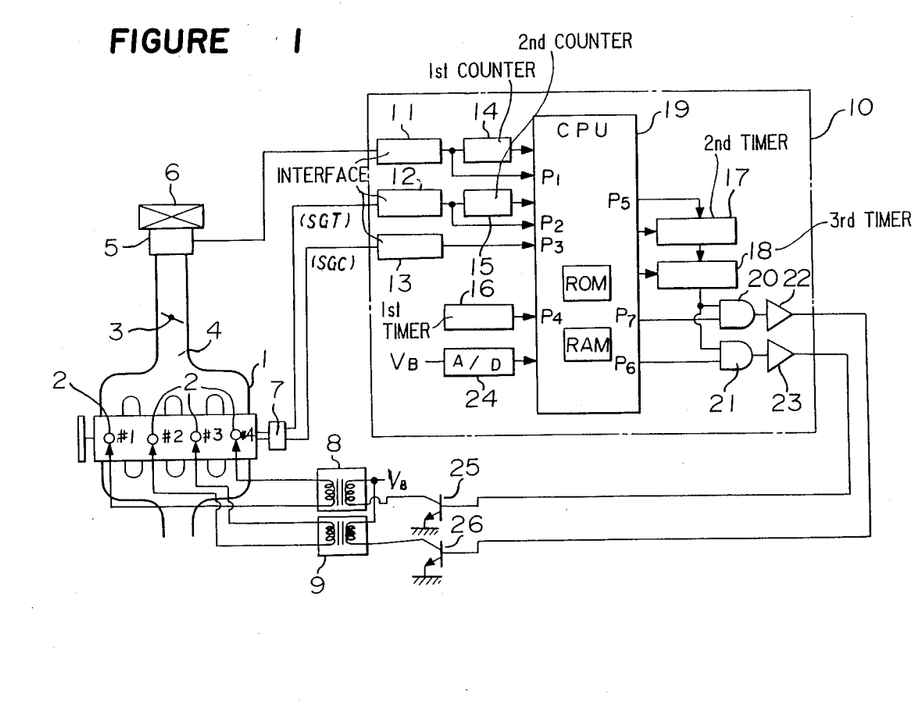
FIG. 1 is a schematic structural diagram of a typical ignition timing control device.

FIG. 1 of the accompanying drawing shows the ignition timing control device in the low tension distribution system, in which a reference numeral 1 designates a four-cylinder engine; a numeral 2 refers to an ignition plug provided in each of the engine cylinders; a reference numeral 3 denotes a throttle valve provided in an air intake pipe 4; a reference numeral 5 represents a Karman's vortex type air flow sensor (hereinafter abbreviated as "AFS") which is disposed at the inlet port of the air intake pipe 4 and for detecting a quantity of intake air; a numeral 6 refers to an air cleaner which is provided at a further inlet side of the AFS 5; a reference numeral 7 denotes a crank shaft angle sensor for detecting revolution of the engine 1, which generates a crank angle reference signal (SGT) and a cylinder discrimination signal (SGC); a numeral 8 refers to a first ignition coil for imparting a high tension voltage to the first and fourth ignition plugs 2; a reference numeral 9 denotes a second ignition coil for imparting a high tension voltage to the second and third ignition plugs 2; a reference numeral 10 designates an ignition control section; numerals 11 to 13 represent interfaces; numerals 14 and 15 refer respectively to first and second counters; numerals 16 to 18 respectively refer to first to third timers; a numeral 19 refers to a CPU (central processing unit) having ROM and RAM; numerals 20 and 21 designate AND circuits; 22 and 23 refer to drivers; 24 refers to an A/D converter; and 25 and 26 refer to transistors.

In the above-described construction, SGT, SGC and an output from the AFS 5 are introduced as inputs into the ignition control section 10, from which a drive signal is forwarded to the ignition coils 8 and 9 alternately through the drivers 23 and 22, respectively, to bring about spark on the first and fourth ignition plugs 2 and the second and third ignition plugs 2, alternately, whereby the first to fourth cylinders are ignited in sequence (note should be taken that, when one of the cylinders is in its compression stroke, the other cylinder is in its exhaust stroke, hence there is no possibility of the two cylinders being ignited simultaneously).

With the above-described conventional device, however, since distribution of the drive signal to each of the ignition coils 8 and 9 is dependent on SGC, if there takes place an abnormal situation in the SGC due to insufficient contact in the connectors, wiring breakage in the harness of the car body, malfunction in the crank angle sensor 7, and so forth, regular distribution of the drive signals cannot be warranted with the consequent inability of the engine to run, destruction of the engine 1 due to erroneous ignition, and others.

Figure 2A:
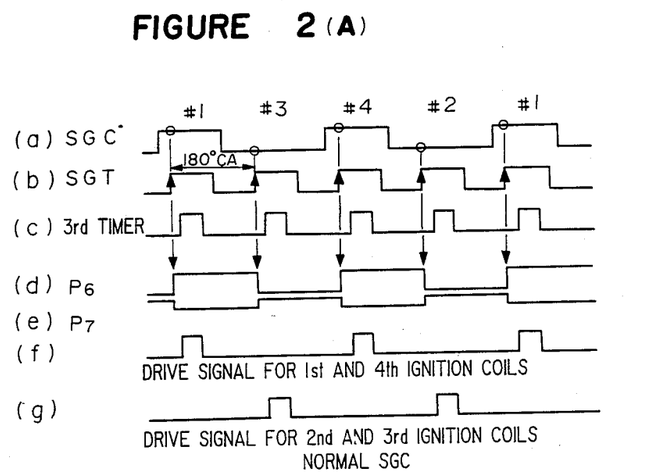
FIGS. 2(A) and 2(B) are waveform diagrams respectively showing a case, wherein the cylinder discrimination signal in the ignition timing control device is normal and a case, wherein it is abnormal.

FIG. 2(A) indicates various operating waveforms at different sections in the ignition timing control device when the SGC is normal, wherein (a) indicates the waveform of SGC; (b) indicates that of SGT; (c) shows that of an output signal from the third timer 18; (d) denotes an output signal from a port P6 of the CPU 19, this output being at its high level (H), when SGC is at its high level (H) at the time of rising of the SGT, and being at its low level (L) when SGC is at its low level (L) at the time of rising of the SGT; (e) denotes that of an output from the port P7, which is at its low level (L) when the output from the port P6 is at its high level (H), and is at its high level (L) when the output from the port P6 is at its low level (L); (f) indicates that of a drive signal for the ignition coil 8 for the first and fourth ignition plugs 2, which signal is obtained from outputs of the timer 18 and the port P6 introduced as inputs into the AND circuit 21, from which an output as the drive signal is forwarded to the ignition coils through the driver 23; and (g) designates that of a drive signal for the ignition coil 9 for the second and third ignition plugs 2, the signal being obtained by alternately forwarding an output from the timer 18 into the AND circuits 20 and 21, during which either of the ignition coils 8, 9 the becomes electrically conducted, and, at the time of shutting the electric current conduction, spark is generated in any of the ignition plugs 2, thereby carrying out sequential ignition of each and every cylinder.

Figure 2B:
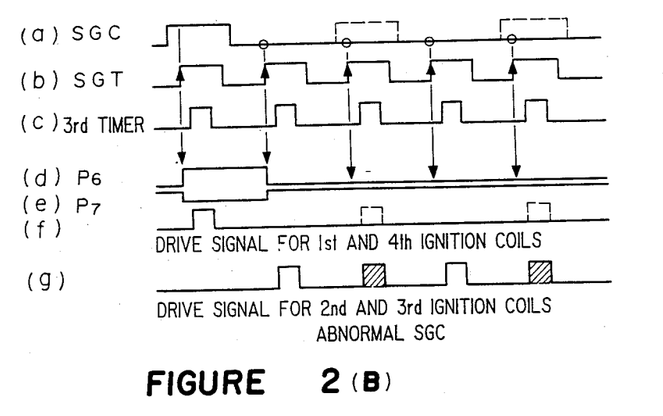

FIG. 2(B) indicates various operating waveforms at different sections in the ignition timing control device when SGC stops. In the drawing, (a) indicates the waveform of the SGC, in which those waveform portions represented by dotted lines are lacking; (b) shows that of the SGT, which is the same waveform as that when the SGT is normal; (c) shows that of the output from the timer 18 which is also normal; (d) and (e) denote various waveforms of the outputs from the ports P6 and P7 respectively; and (f) and (g) denote waveforms of the drive signals for the ignition coils 8 and 9, respectively, in which the drive signal (g) contains therein erroneous distribution portions as indicated by diagonal hatch lines, which are liable to cause inability of the engine to run or destruction of the engine due to erroneous ignition.

Further, there occur various noises in the engine 1, and these noises, when superposed on the SGC, become unable to be eliminated, depending on its magnitude, even with a filter circuit. On accont of this superposition of the noises on the SGC, there take place problems such that, due to erroneous reading of the SGC, the drive signals for the ignition coils 8 and 9 cannot be regularly distributed to thereby cause inability of the engine to run or destruction of the same due to erroneous ignition, or others.

SUMMARY OF THE INVENTION

The present invention has been made with a view to solving the points of problem as mentioned above, and aims at preventing the drive signal from being distributed erroneously due to undesirable noises or abnormality in the SGC, thereby avoiding inability of the engine to run or destruction of the same.

According to the present invention in one aspect, there is provided an ignition timing control device for an internal combustion engine, which comprises in combination: load detecting means for detecting a load on the engine; engine-revolution detecting means for detecting number of revolution of the engine; cylinder discrimination signal generating means for generating cylinder discrimination signal; operating means for operating the optimum ignition timing for the engine based on the outputs from the load detecting means and the engine-revolution detecting means; drive signal generating means for generating drive signal corresponding to the ignition timing for each of ignition coils provided in each cylinder; and distribution means for distributing the drive signal to each of the ignition coils in appropriate sequence on the basis of the cylinder discrimination signal, wherein said distribution means is provided with distribution sequence maintaining means for maintaining the distribution sequence of the drive signal, even when the cylinder discrimination signal is stopped.

According to the present invention, in another aspect, there is provided an ignition timing control device for an internal combustion engine, which comprises in combination: load detecting means for detecting a load on the engine; engine-revolution detecting means for detecting number of revolution of the engine; cylinder discrimination signal generating means for generating cylinder discrimination signal; operating means for operating the optimum ignition timing for the engine based on the outputs from the load detecting means and the engine-revolution detecting means; drive signal generating means for generating drive signal corresponding to the ignition timing for each of ignition coils provided in each cylinder; and distribution means for distributing the drive signal to each of the ignition coils in appropriate sequence on the basis of the cylinder discrimination signal, wherein the distributing means is so constructed that, in case an ignition coil to which the drive signal is to be distributed is the same as that to which the drive signal has been distributed a previous time, the drive signal is distributed to the corrected ignition coil.

The foregoing objects, other objects as well as the specific construction and function of the present invention will become more apparent and understandable from the following detailed description with reference to a few preferred embodiments thereof, when read in conjunction with the accompanying drawing.

BRIEF DESCRIPTION OF THE DRAWINGS

In the drawing:

FIGS. 3(a-g) are a waveform diagram showing a case, wherein the cylinder discrimination signal in the ignition timing control device according to the present invention is abnormal;

FIGS. 4(a-c) are a partly enlarged operating waveform diagram indicating various operating waveforms in different sections of the ignition timing control device according to the present invention;

FIGS. 8(a-f) are a waveform diagram indicating various operating waveforms at different sections of the typical ignition timing control device according to the second embodiment of the present invention, wherein the cylinder discrimination signal (SGC) is normal;

FIGS. 9(a-f) are a waveform diagram showing various operating waveforms in different sections of the ignition timing control device according to the second embodiment of the present invention, when noises are superposed on the SGC;

DETAILED DESCRIPTION OF THE PREFERRED EMBODIMENTS

In the following, the present invention will be described in detail with reference to the first embodiment thereof, the construction of which is the same as that shown in FIG. 1 of the accompanying drawing.

Figure 5A:
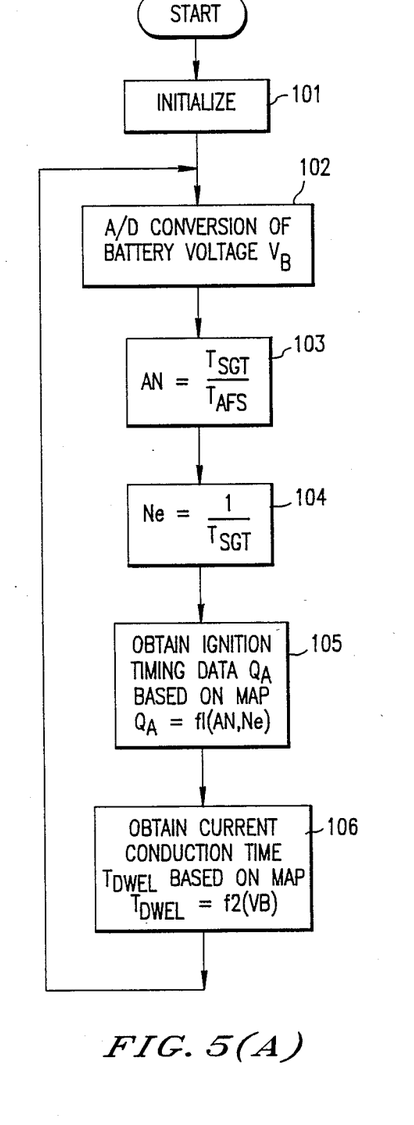
FIGS. 5(A), 5(B) and 5(C) are flow charts showing the operations of the ignition timing control device according to the present invention.
Figure 6:
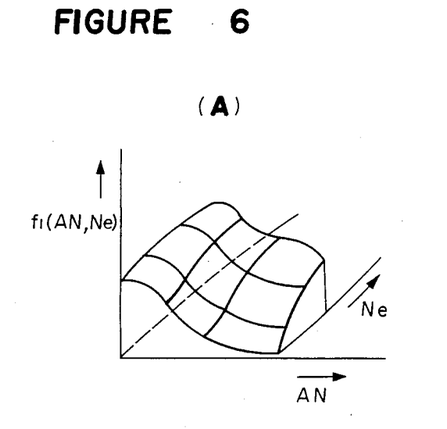
FIGS. 6(A) and 6(B) are graphical representations showing characteristic maps as stored in the ignition timing control section according to the present invention.

Referring to FIG. 5(A) showing the main routine operations of the ignition control section 10, initialization is effected at the step 101, and then a battery voltage $V_B$ is A/D-converted by means of the A/D converter 24 to introduce an output therefrom into the CPU 19. At the step 103, an intake air quantity AN during a period of single suction is operated from a period $T_{SGT}$ of the crank angle reference signal (SGT) and an output period $T_{AFS}$ from the AFS 5. At the step 104, an engine revolution $N_e$ is operated from the period $T_{SGT}$. At the step 105, an ignition timing data $\theta_A$ is operated on the basis of the map shown in FIG. 6(A), which has been stored in the ROM of the CPU 19. At the step 106, an electric current conduction time data $T_{DWEL}$ is operated on the basis of the map shown in FIG. 6(B), which has also been stored in the ROM, after which the operational sequence returns to the step 102.

Figure 5B:
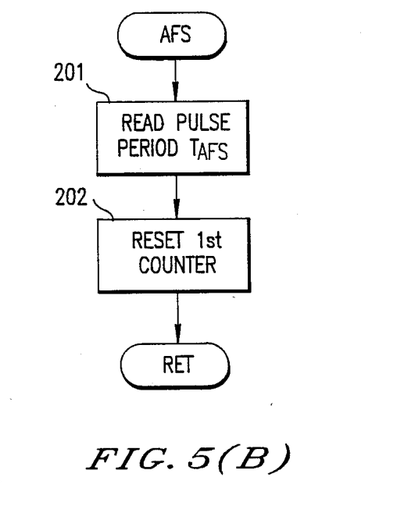

FIG. 5(B) shows an interruption processing of an output from the AFS 5. That is to say, at the step 201, an output pulse period $T_{AFS}$ from the AFS 5 which has been counted in the first counter 14 is read, and, at the step 202, the counter 14 is reset.

Figure 5C:
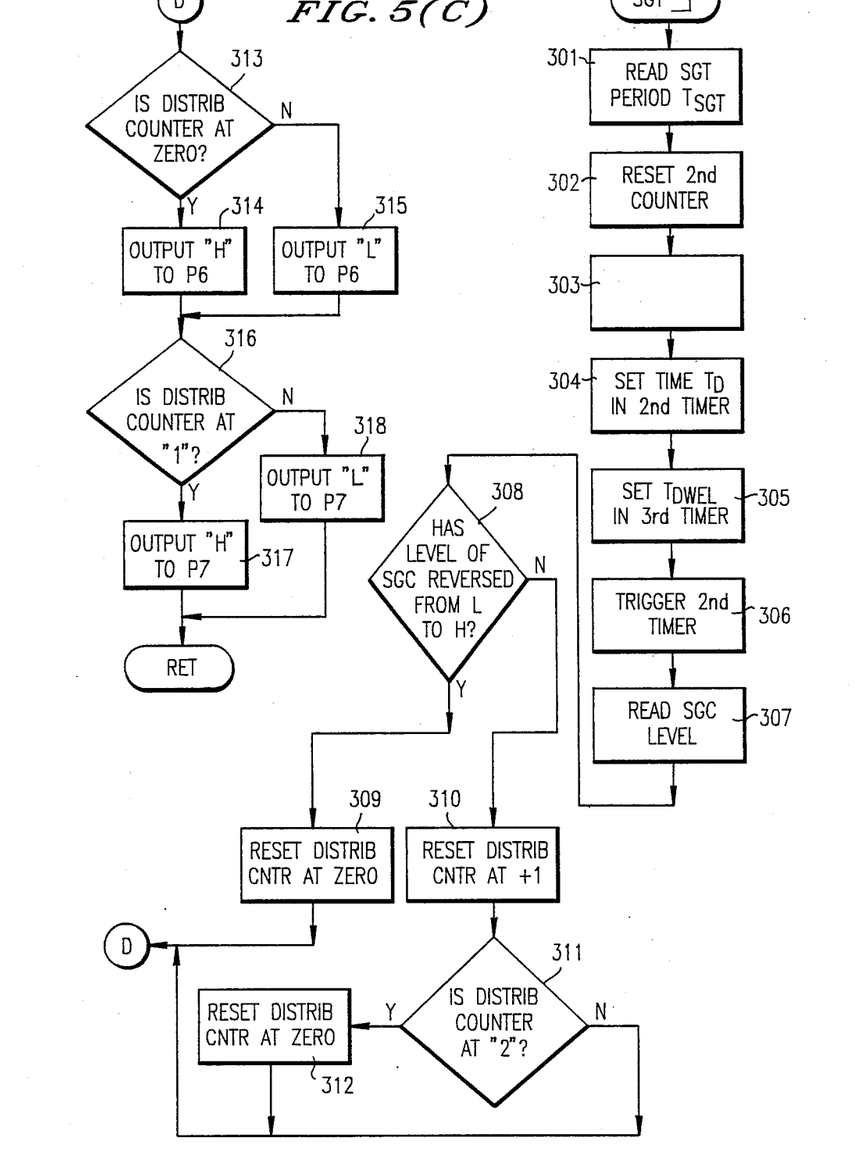

FIG. 5(C) shows an interruption processing at the time of rising of the SGT, wherein, at the step 301, an SGT period $T_{SGT}$ is counted by the second counter 15 and read in the CPU 19; at the step 302, the counter 15 is reset; and at the step 303, values of $T_A = T_{SGT} \times 90 - \theta_A/180$ and $T_D = T_A - T_{DWEL}$ are operated.

Figure 4:
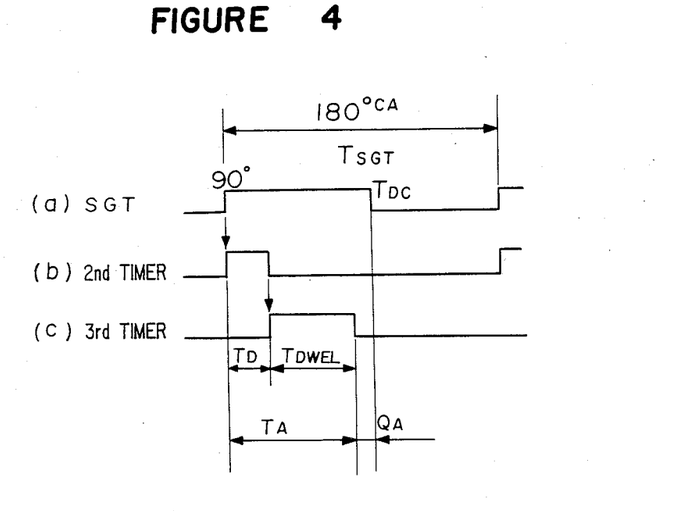

By the way, in FIG. 4, (a) indicates a waveform of the SGT; (b) shows a waveform of the second timer 7; and (c) represents a waveform of the third timer 18. The timer 18 rises in pursuance of trailing of the timer 17, whereby the electric current conduction starts. $T_A$ designates a time from rising of the SGT to the termination of the electric current conductions, while $T_D$ designates a time from rising of the SGT to the commencement of the electric current conduction.

At the step 304, the time $T_D$ is set in the timer 17, while, at the step 305, the conduction time data $T_{DWEL}$ is set in the timer 18. At the step 306, the timer 17 is triggered. At the step 307, the level of the SGC is read. At the step 308, judgement is made as to whether the level of the SGC has reversed from L (low) to H (high), or not. If the reversal has occurred, a distribution counter is reset at zero at the step 309, and, if no reversal has taken place, the distribution counter is added with +1 at the step 310. At the step 311, judgement is made as to whether the distribution counter is at 2 or not. If it is at 2, the distribution counter is reset at 0 at the step 312, and if it is not at 2, i.e., if it is at 1, the operational sequence goes to the step 313. At the step 313, judgement made as to whether the distribution counter is at 0 or 1. If it is at 0, a signal H is outputted to the port P6 at the step 314, and if it is at 1, a signal L is outputted to the port P6 at the step 315. At the step 316, judgement is made as to whether the distribution counter is at 1 or not. If it is at 1, a signal H is outputted to the port P7 at the step 317, and if it is at 0, a signal L is outputted to the port P7 at the step 318.

The operating waveform in each section of the ignition timing control device, when the SGC is normal, is the same as that shown in FIG. 2(A).

Figure 3:
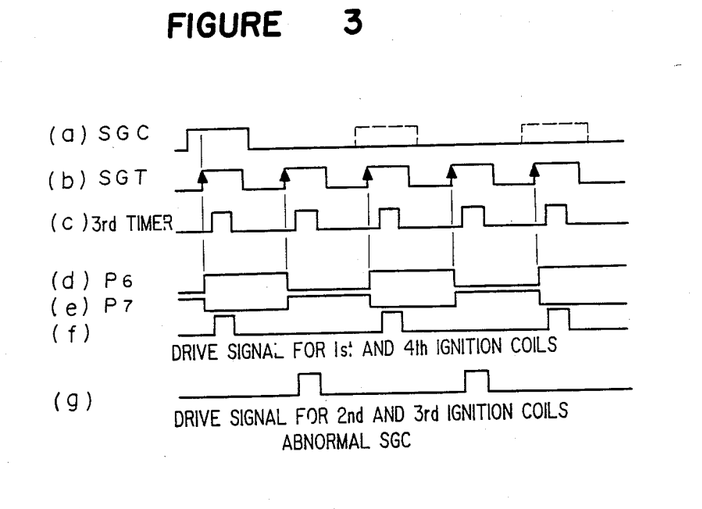

FIG. 3 shows the waveform in every section of the ignition timing control device, when the SGC is stopped. In this case, even if the SGC is stopped as shown in (a), outputs from the ports P6 and P7 remain same as its normal condition, as shown in (d) and (e), with the consequence that ignition coil drive signals are distributed regularly, whereby the ignition is done regularly.

In the flow chart of FIG. 5(C), if the SGC is normal, an output at the step 308 repeats "YES" and "NO", and the distribution counter repeats 0 and 1. On the other hand, if the SGC is abnormal, an output at the step 308 continues "NO" for twice or more. Even in this case, the distribution counter repeats 0 and 1 as is the case with the SGC being normal.

As described in the foregoing, according to the first embodiment of the present invention, since the distribution function of the drive signal to the ignition coil is done regularly, even when the cylinder discrimination signal is stopped due to insufficient contact of the connectors, which might happen during the engine running, there is no influence caused to the running function of the engine, whereby no destruction of the engine will take place due to erroneous ignition, hence operating reliability of the ignition function can be increased.

Figure 7:
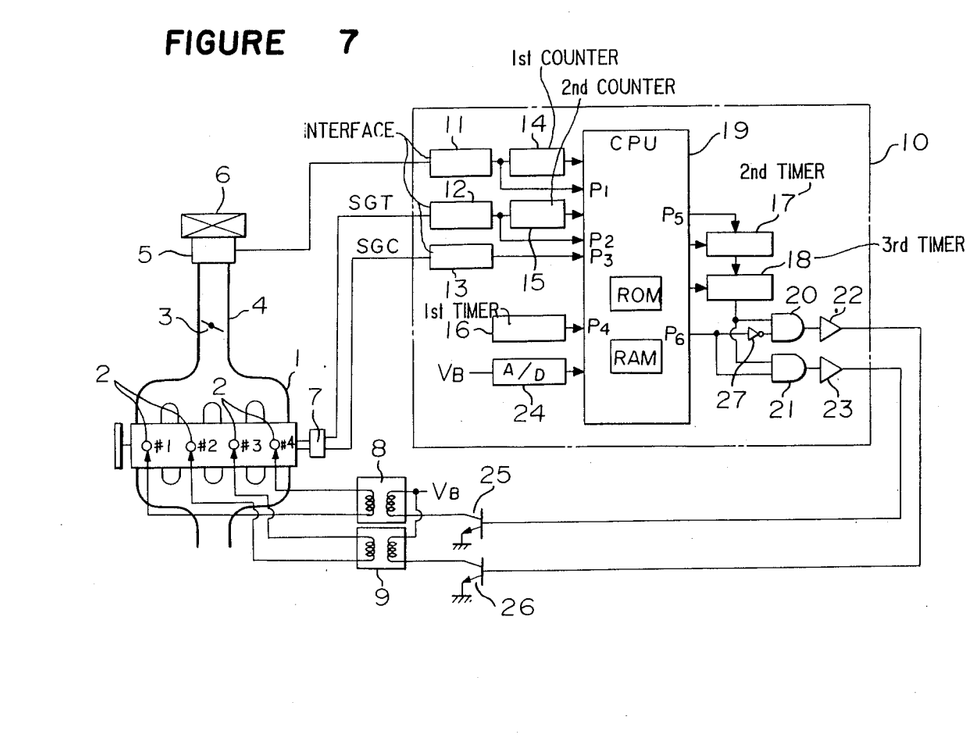
FIG. 7 is a schematic structural diagram showing the ignition timing control device according to the second embodiment of the present invention.

FIG. 7 is a schematic structural diagram showing the second embodiment of the ignition timing control device according to the present invention. In the drawing, the same reference numerals as used in FIG. 1 designate the identical or corresponding parts. This second embodiment of the ignition timing control device according to the present invention is the same as that of FIG. 1 in its construction, with the exception that the port P7 of the CPU 19 is removed, and that the CPU 19 is connected, through its port P6, with the AND circuit 20 by way of a NOT circuit 27, and is directly connected with the AND circuit 21.

In the following, explanations will be given in reference to the flow charts of FIGS. 10(A), 10(B) and 10(C) as to the operations of the above-described ignition timing control device according to the present invention.

Figure 10:
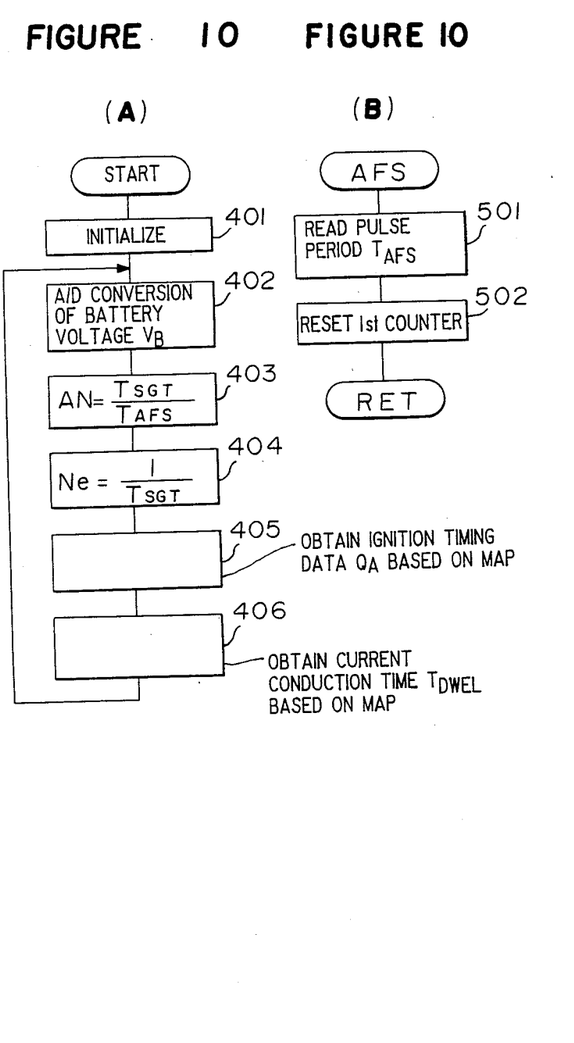
FIGS. 10(A), 10(B) and 10(C) are flow charts showing the operations of the ignition timing control device according to the second embodiment of the present invention.

The main routine of the FIG. 10(A) and the interruption processing routine of the pulse period $T_{AFS}$ in the AFS 4 of FIG. 10(B) are the same as the first embodiment as has been explained above with reference to FIGS. 5(A) and 5(B), hence explanations thereof will be dispensed with.

In FIG. 10(C) indicating the interruption processing routine from the rising of the SGT onward, the steps 601 to 606 are the same as the steps 301 to 306 for the interruption processing routine shown in FIG. 5(C), hence the explanations will be made from the subsequent step 607 onward.

At the step 607, after the timer 17 is triggered to commence the ignition operation at the step 606, the lowest bit data in the distribution register is reversed with a view to predicting the distribution of the drive signal at this time from the previous distribution by the distribution register in the CPU 19.

A the step 608, the level of the SGC is read. At the step 609, judgement is made as to whether the lowest bit of the distribution register has the same level as that of the SGC, or not. If it has the same level, the SGC level is set in the lowest bit of the distribution register for renewal at the step 610. At the step 611, a judgement counter in the CPU 19 (a counter which determines the consecutive number of times, in which the SGC as predicted, i.e., the lowest bit of the distribution register does not coincide with the actual SGC) is set at n. At the step 612, judgement is made as to whether the lowest bit of the distribution register is 1 or 0. In the case of its being 1, a signal H is outputted to the port P6 at the step 613, while, in the case of its being 0, a signal L is outputted to the port P6. When the judgement rendered at the step 609 is not same, the judgement counter is reduced by −1 at the step 615 to make judgement as to whether it is 0 or not. In case it is not 0, the operational sequence proceeds to the step 612 onward to determine an output from the port P6 by the lowest bit of the distribution register. In the case of its being 0, i.e., in the case of the non-coincidence having continued for a predetermined number of times, there is no continued occurrence of noises, hence it is judged that the information for the predicted distribution went wrong for some reason or other, with the consequence that the lowest bit is renewed with the actual SGC so as to effect the distribution with the actual SGC. Thus, in the above-described embodiment, the construction of this embodiment is such that the level of the SGC is predicted in order to forecast the distribution of the drive signal at this time from the previous distribution, and, when the level of the SGC as predicted coincides with the actual level of the SGC, the drive signal for the ignition coil is distributed on the basis of the actual level of the SGC, and when both levels of the SGC do not coincide, the drive signal is distributed on the basis of the predicted level of the SGC, and further, when such non-coincidence has occurred consecutively for a predetermined number of the times, the drive signal is distributed on the basis of the actual level of the SGC. Accordingly, even when an abnormality occurs in the SGC due to noises, the drive signal can be distributed accurately, and, even when something went wrong with the predicted information, appropriate measures can be taken without failure.

Figure 8:
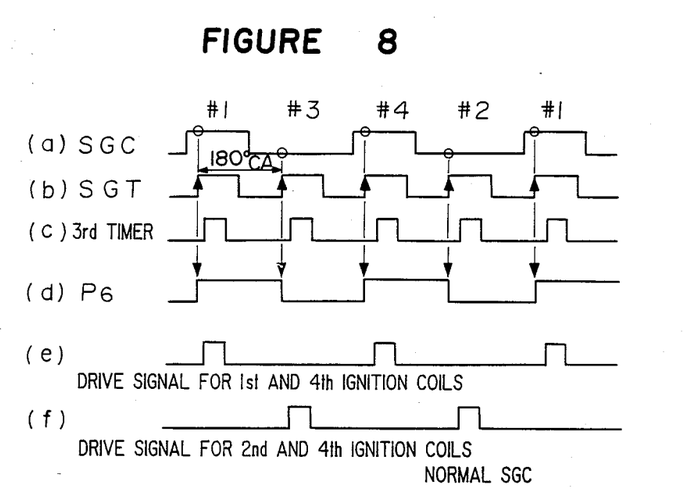
Figure 9:
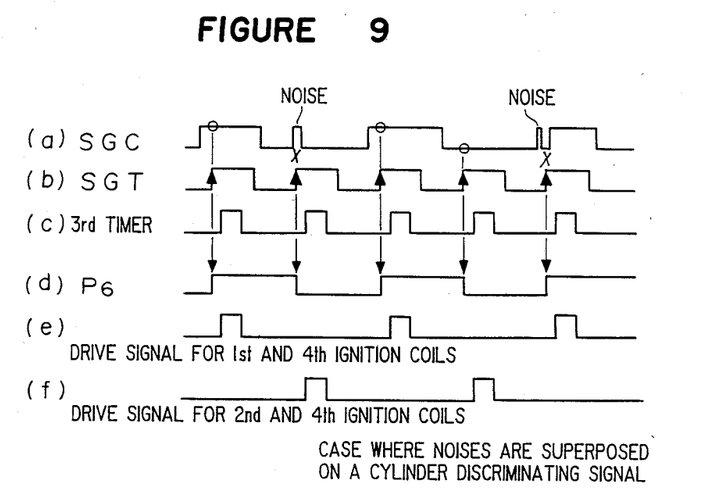

FIG. 8 indicates the operating waveforms in every part of the ignition timing control device, when the SGC is normal. FIG. 9 shows a state wherein noises are superposed on the SGC. With the ignition timing control device according to this embodiment of the present invention, even if noises are superposed on the SGC, and output from the port P6 is maintained normal, whereby regular distribution of the drive signal can be secured.

As mentioned so far in the foregoing, according to the second embodiment of the present invention, even when abnormality occurs in the cylinder discrimination signal (SGC) due to noises, etc. which are generated from every section of the engine, distribution of the drive signal at the present time is predicted from the previous distribution, and when the ignition coil as predicted differs from the ignition coil to be designated by the cylinder discrimination signal, the drive signal is preferentially distributed to the predicted ignition coil, whereby it becomes possible to prevent the engine from destruction due to its inability to run or erroneous ignition, whereby the ignition function can be increased.

Figure 11:
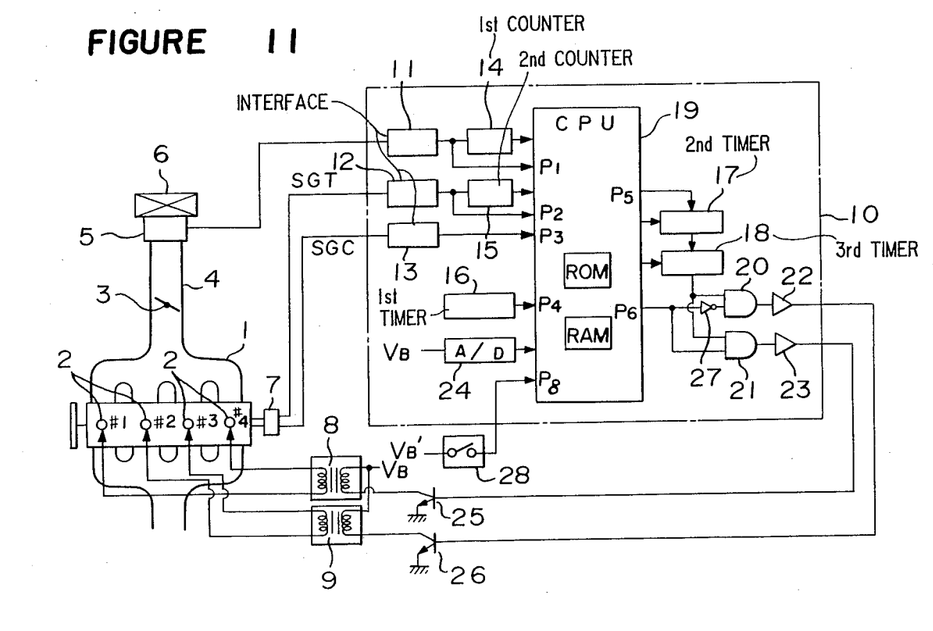
FIG. 11 is a schematic structural diagram of the ignition timing control device according to the third embodiment of the present invention.

FIG. 11 is a schematic structural diagram of the ignition timing control device according to the third embodiment of the present invention. The construction as shown in FIG. 11 is identical with that of the second embodiment as shown in FIG. 7, with the exception that an input port P8 is provided in the CPU 19, and a power source $V_B$ is connected with the input port P8 via a starter switch 28. The starter switch 28 is provided to detect that the engine 1 is at its start.

In the following, explanations will be given in reference to FIGS. 12(A), 12(B) and 12(C) as to the operations of this third embodiment of the present invention.

Figure 12A:
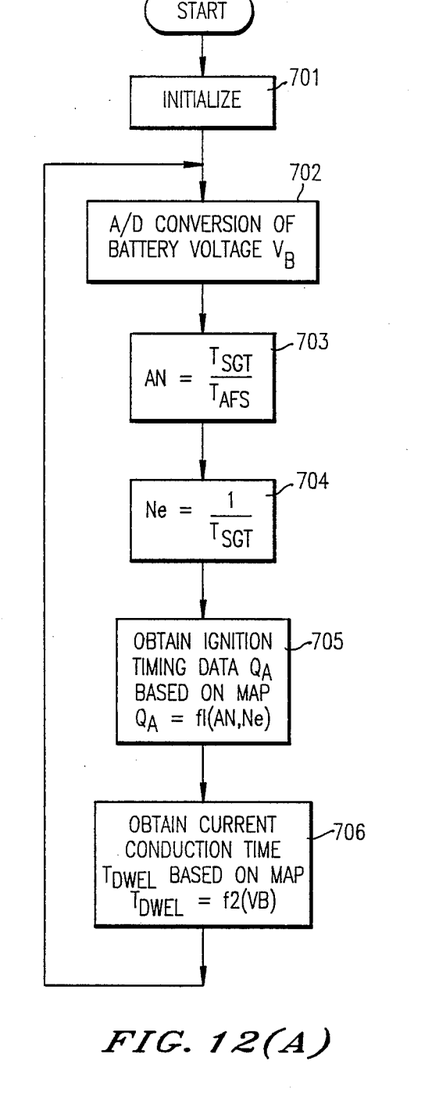
FIGS. 12(A), 12(B) and 12(C) are flow charts indicating the operations of the ignition timing control device according to the third embodiment of the present invention.
Figure 12B:
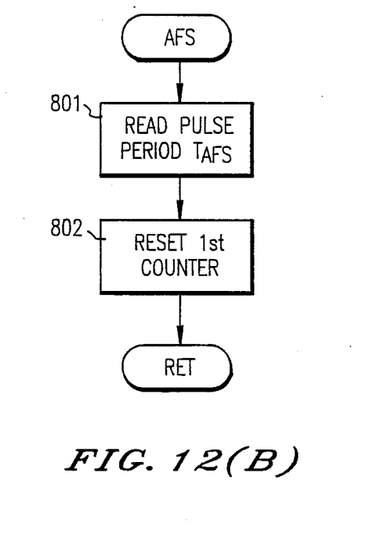
Figure 12C:
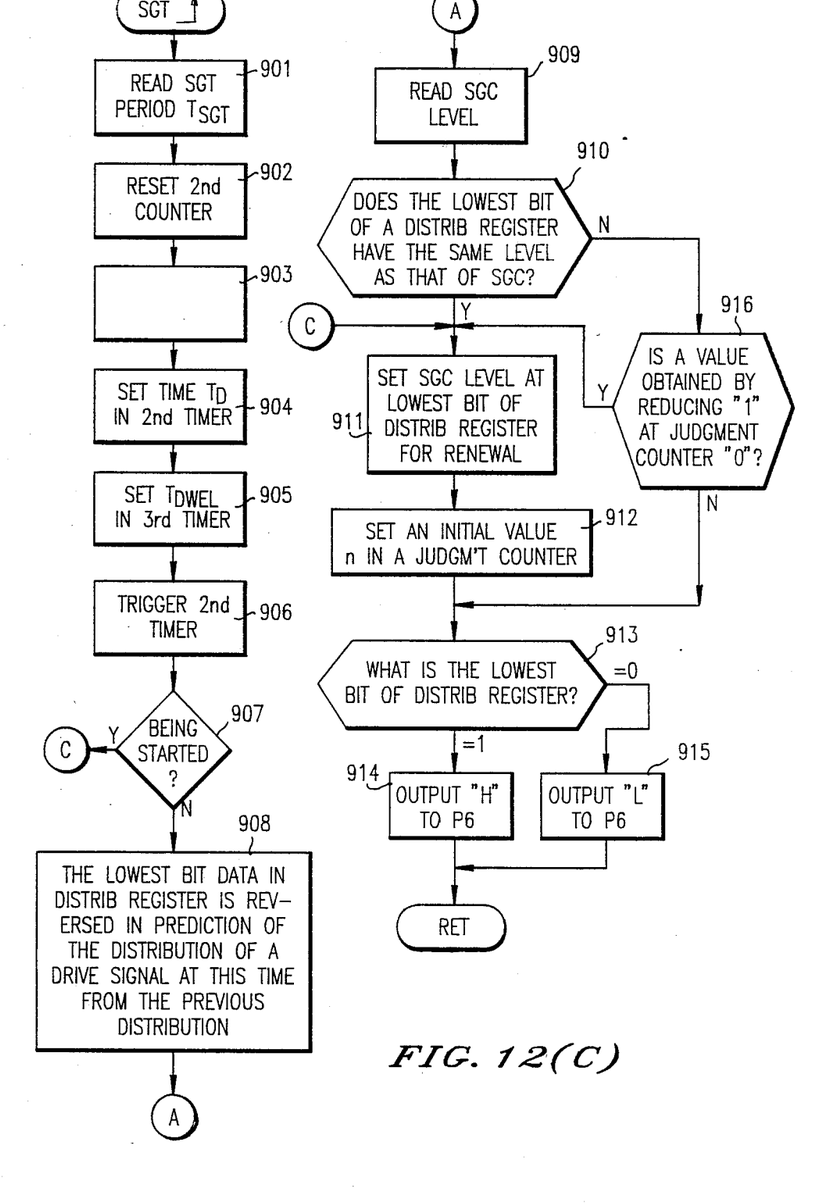

The main routine shown in FIG. 12(A) and the interruption routine of the pulse period in the AFS shown in FIG. 12(B) are exactly same as those in the aforedescribed first and second embodiment of the ignition timing control device according to the present invention, hence the explanations thereof will be dispensed with. Also, as to the interruption routine shown in FIG. 12(C) from the steps 901 to 906, i.e., from the rising of the SGT onward, is identical with the processing steps 601 to 606 in FIG. 10(C) which have been explained in connection with the second embodiment of the present invention, so that the explanations of this interruption routine in FIG. 12(C) will be given from the step 907 onward.

At the step 907, judgement is made as to whether the engine is at its start, or not. If it is not at the start, the data in the lowest bit of the distribution register is reversed, at the step 908, in order to predict distribution of the drive signal at the present time from the previous distribution by the distribution register in the CPU 19. At the step 909, the level of the SGC is read. At the step 910, judgement is made as to whether the lowest bit of the distribution register is identical with the level of the SGC or not. If both of them are identical, the level of the SGC is set in the lowest bit of the distribution register, at the step 911, for renewal. At the step 912, a judgement counter in the CPU 19 (a counter for judging the consecutive number of times, in which the predicted SGC, i.e., the lowest bit of the distribution register does not coincide with the actual SGC) is set at n. At the step 913, judgement is made as to whether the lowest bit of the distribution register is 1 or 0. In the case of its being 1, the signal H is outputted to the port P6 at the step 914, while, in the case of its being 0, the signal L is outputted to the port P6. When the judgement made at the step 910 is not identical, the judgement counter is reduced by $-1$, at the step 916, to determine whether it is 0, or not. If it is not 0, the operational sequence goes to the step 913 to determine the output from the port P6 by the lowest bit of the distribution register. In the case of its being 0, that is, in the case of such non-coincidence having continued for predetermined number of times, it is judged that something went wrong with the predicted distribution information for some reason because the noises did not occur continuously, with the consequence that the lowest bit is renewed by the actual SGC to effect distribution of the drive signal by such actual SGC. In case the engine is at its start at the step 907, the operational sequence proceeds to the step 911 onward, and the distribution of the drive signal is done by the actual SGC.

Further, at the start of the engine 1, the sequence in the phase relationship between the SGC and the SGT, because the rotational direction of the crank angle sensor 7 fluctuates without its being stable in one direction. Also, it is difficult to predict the distribution of the drive signal at the present time from the previous distribution, because the initial state of the engine is not stable, hence the engine starting performance becomes deteriorated. In this third embodiment, therefore, the distribution of the drive signal is determined faithfully in accordance with the cylinder discrimination signal (SGC) during the engine starting, whereby the starting performance of the engine can be made satisfactory.

According to this third embodiment of the ignition timing control device according to the present invention, as is the case with the second embodiment thereof, it is possible to eliminate the erroneous ignition of the engine due to the noises generated therefrom, and, at the same time, the distribution of the drive signal is done faithfully in accordance with the cylinder discrimination signal at the engine starting when a current distribution of the drive signal is difficult to be predicted from the previous distribution, thereby improving the starting performance of the engine.

Incidentally, in the above-described second and third embodiment of the present invention, when no measures are taken against disorders in the predicted information, the steps 611, 615 or 912, 916 become unnecessary. The ignition timing control device of this invention is also applicable to a case where abnormality occurs in the SGC due to other causes than the noises generated from the engine.

The present invention can be put into practice, even when four ignition coils are provided, by codification of the distribution register. For example, at every time the SGC of the first cylinder is generated, 0 is set in the distribution register, and thereafter, at every time the SGT is generated, the distribution register is added with $+$, and at every time the content of the register takes 4, it is set in 0. In this way, the first to fourth cylinders can be codified respectively from 0 to 3. Further, in the above-described embodiments, the single unit of timer 18 is provided to generate the drive signal for the ignition coil, and the output from it is distributed. It is however feasible to provide an independent timer for each coil drive signal and to distribute a trigger signal for actuating this timer in correspondence to the content of the distribution register. In this case, there can be attained the coil drive signal having its circuit closing ratio of 100% or above.

So far, the present invention has been described in detail with reference to preferred embodiments thereof as illustrated in the drawing. It should however be noted that these embodiments are merely illustrative and not so restrictive, and that any changes and modifications may be made by those persons skilled in the art within the spirit and scope of the invention as recited in the appended claims.

What is claimed is:

1. In an ignition timing control device for an internal combustion engine comprising in combination:
    load detecting means for detecting a load on the engine;
    engine-revolution detecting means for detecting a number of revolution of the engine;
    cylinder discrimination signal generating means for generating a cylinder discrimination signal;
    operating means for operating the optimum ignition timing for the engine based on the output from the load detecting means and the engine-revolution detecting means;
    drive signal generating means for a generating drive signal corresponding to the ignition timing for each of ignition coils provided in each cylinder; and
    distribution means for distributing the drive signal to each of the ignition coils in appropriate sequence on the basis of the cylinder discrimination signal, wherein said distribution means predicts an ignition coil to which the drive signal is to be distributed and determines the ignition coil to which the drive signal is to be distributed, and determines the ignition coil to which the drive signal has been distributed previously, and distributes the drive signal to the predicted ignition coil in case an ignition coil designated by the cylinder discrimination signal is different from the predicted ignition coil.

2. An ignition timing control device according to claim 1, wherein said distribution means sets the level of said cylinder discrimination signal in the lowest bit of a distribution register in said operating means, and after which carries out determination of the data of the lowest bit in said distribution register.

3. An ignition timing control device according to claim 1, wherein the drive signal is distributed to the ignition coil designated by said cylinder discrimination signal during starting of the engine.

4. An ignition timing control device according to claim 1, wherein said distribution means distributes the drive signal to said ignition coil designated by said cylinder discrimination signal when the predicted ignition coil is different from the ignition coil designated by said cylinder discrimination signal for a predetermined number of times in succession.

* * * * *